United States Patent
Dong et al.

(10) Patent No.: US 8,737,437 B2
(45) Date of Patent: May 27, 2014

(54) FIBER LASER CAVITY OPTICAL ENGINE PACKAGE AND METHOD OF MAKING THE SAME

(71) Applicant: OFS Fitel, LLC, Norcross, GA (US)

(72) Inventors: Hao Dong, Bridgewater, NJ (US); William R Holland, Upper Black Eddy, PA (US); Jerome C Porque, Bridgewater, NJ (US); William J Strachan, Hillsborough, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/751,950

(22) Filed: Jan. 28, 2013

(65) Prior Publication Data

US 2013/0230061 A1    Sep. 5, 2013

Related U.S. Application Data

(60) Provisional application No. 61/606,988, filed on Mar. 5, 2012.

(51) Int. Cl.
*H01S 3/30* (2006.01)

(52) U.S. Cl.
USPC .................................. 372/6; 372/34; 372/36

(58) Field of Classification Search
CPC ... H01S 3/06704; H01S 3/067; H01S 3/0675; H01S 3/04; H01S 3/042; H01S 3/0405; H01S 3/0401
USPC ................................................... 372/6, 34, 36
See application file for complete search history.

(56) References Cited

U.S. PATENT DOCUMENTS

| | | | |
|---|---|---|---|
| 6,459,068 B1 * | 10/2002 | Yamaura et al. | 219/121.6 |
| 6,801,550 B1 * | 10/2004 | Snell et al. | 372/6 |
| 7,400,812 B2 * | 7/2008 | Seifert | 385/135 |
| 2006/0002434 A1 * | 1/2006 | Nakano et al. | 372/6 |
| 2013/0044776 A1 * | 2/2013 | Schlie et al. | 372/34 |

* cited by examiner

*Primary Examiner* — Kinam Park (57) ABSTRACT

Embodiments of the invention include a fiber laser cavity package having improved fiber management and thermal management capability and methods of making such fiber laser cavity package. Each element of the fiber laser cavity is grouped into plurality of sections and each section is placed onto a heat conducting surface within the fiber laser cavity package to dissipate unwanted heat from the elements. When the fiber laser cavity is stored in the package, the fiber laser cavity is arranged such that fiber crossings are substantially reduced or eliminated within the package.

26 Claims, 9 Drawing Sheets

PRIOR ART

FIBER LASER CAVITY OPTICAL ENGINE PACKAGE AND METHOD OF MAKING THE SAME

CROSS-REFERENCE TO A RELATED APPLICATION

The present application claims the priority benefit of U.S. Provisional Patent Application Ser. No. 61/606,988, entitled "Fiber laser optical engine package," filed on Mar. 5, 2012, which is owned by the assignee of the present application, and which is incorporated herein by reference in its entirety.

TECHNICAL FIELD

This invention generally relates to fiber management, and more particularly, to fiber management of a high-power fiber laser cavity within a package.

BACKGROUND OF THE INVENTION

Essential components of a fiber laser are a fiber laser cavity and pump diodes. The fiber laser cavity is a fiber-based, resonant optical cavity with an optical gain section, and is usually stored in a package to enhance reliability. However, the demand for high-power application generates unwanted heat, which undermines reliability of the fiber laser cavity stored in the package. In order to address the issue, U.S. Pat. No. 7,400,812 discloses a ring-shape body that accommodates one or more loops of an optical fiber. Although the ring-shape body has means to increase heat transfer to enhance heat dissipation from the fiber, the ring-shape body is rather complex and placing the fiber within the ring-shape body is difficult. Although the prior art addresses one solution to dissipate unwanted heat, drawbacks still exist. Beside thermal management, practical solution requires improvements of other functionalities within the package. Therefore, there is still a need to improve fiber laser cavity packages.

BRIEF SUMMARY OF THE INVENTION

Therefore, an objective of the present invention is to provide fiber laser cavity packages having improved fiber and thermal management capabilities and methods of making such fiber laser cavity packages. According to one embodiment of the present invention, a multi-layer fiber laser cavity package is provided. The multi-layer fiber laser cavity package includes a first layer containing one or more elements of a fiber laser cavity, and one or more layers stacked on top of the first layer and containing the rest of the elements of the fiber laser cavity. The elements are different portions of the fiber laser cavity and include a gain fiber, a grating, a splice and a tapered fiber bundle (TFB). Substantially all of the fiber laser cavity in the package is in contact with a heat-conducting. And, the fiber laser cavity passes from one layer to another layer without any fiber crossings.

According to another embodiment of the present invention, a method of making a multi-layer fiber laser cavity package is provided. The method includes the steps of grouping elements of a fiber laser cavity into two or more sections, and stacking one section on top of another section to create multiple layers within the multi-layer fiber laser cavity package. Substantially all of the fiber laser cavity in the package is in contact with a heat-conducting surface. And, the fiber laser cavity passes from one layer to another layer without any fiber crossings.

According to yet another embodiment of the present invention, a method of making a laser cavity package is provided. The method includes the steps of selecting one or more heating elements of a fiber laser cavity, grouping a first section of heating elements that generate the most heat during operation, placing the first section of the heating elements to a first heat-conducting surface closest to a cooling source, grouping the other heating elements into one or more sections, and placing the one or more sections onto one or more heat-conducting surfaces thermally connected to the first heat-conducting surface. The heating elements are different portions of the fiber laser cavity and include a gain fiber, a grating, a splice and a TFB. The fiber laser cavity passes from the first heat-conducting surface to the one or more heat-conducting surfaces without any fiber crossings.

BRIEF DESCRIPTION OF THE DRAWINGS

Reference will now be made to the accompanying figures and flow diagrams, which are not necessarily drawn to scale, and wherein.

DETAILED DESCRIPTION

In the following description, similar components are referred to by the same reference numeral to enhance the understanding of the invention through the description of the drawings. Also, unless otherwise explicitly specified herein, the drawings are not drawn to scale.

Figure 1:
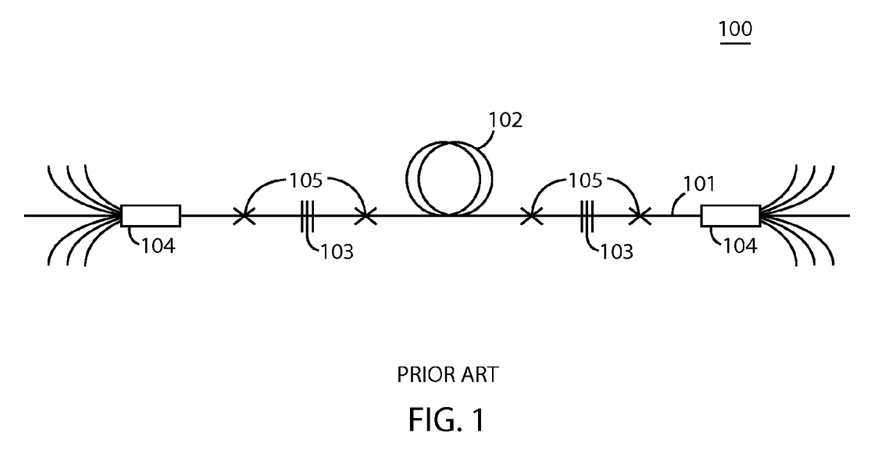
FIG. 1 is a diagram of an example of a conventional fiber laser cavity.

Typical configuration of a conventional fiber laser cavity 100 is shown in FIG. 1. A fiber laser cavity 100 to be stored in a package typically includes a gain fiber 102, one or more gratings 103, one or more tapered fiber bundles (TFB) 104, and one or more splices 105. Those elements are optically connected together to form the fiber laser cavity 100.

High-power fiber laser cavity packages must be designed to dissipate unwanted heat accumulated by different elements of a fiber laser cavity and provide mechanical robustness and protection for the cavity. One way to address the issue is better fiber management within a package. Poor fiber management within the fiber laser package creates one or more fiber crossings. Fiber crossing means one portion of a fiber laser cavity is physically in contact with another portion. Fiber crossings in the package may create thermal management and structural issues. For high-power lasers, such fiber crossing may cause more serious problems such as overheating of the fiber laser cavity and, possibly, burning fiber.

In addition to thermal management, fiber management is also important for maintenance and future possible modification of the fiber laser cavity. It is often desired to have access to one or more fiber elements without disturbing other elements in the cavity. While a modular design could possibly address this issue, multiple separate modules would increase the size of the package, require additional cooling elements, and increase the package footprint and the cost.

Figure 2:
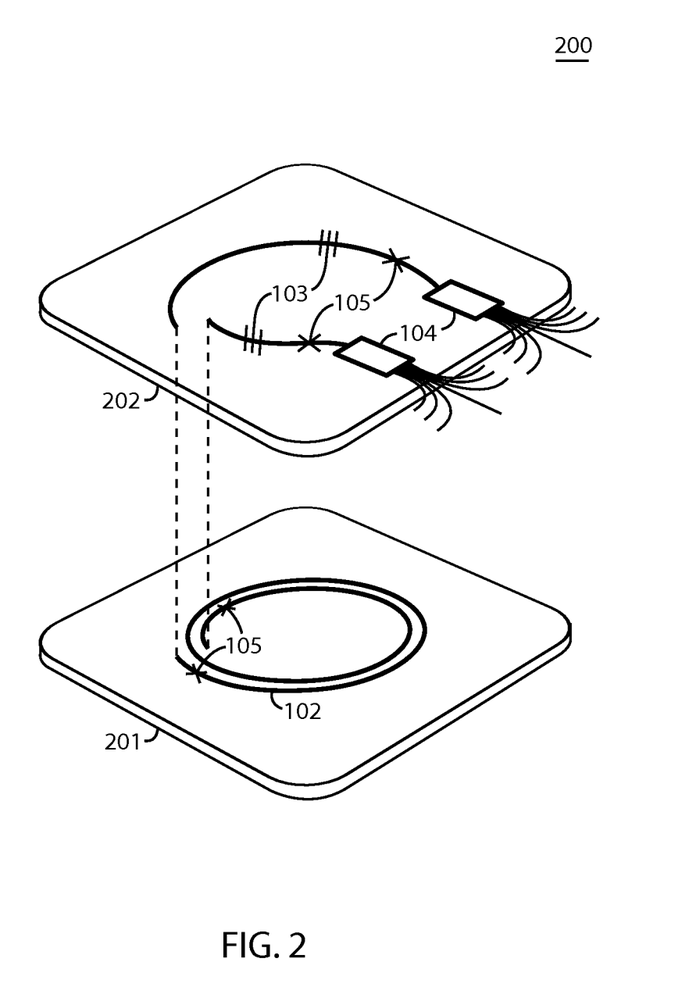
FIG. 2 is a diagram of a fiber laser cavity package according to an embodiment of the present invention.

One way to improve fiber management of the fiber laser cavity within a package is to store a fiber laser cavity into a multi-layer fiber laser cavity package. FIG. 2 shows a fiber laser cavity package 200 according to an embodiment of the present invention. The multi-layer laser cavity package 200 has a first layer 201 and a second layer 202. The first layer 201 contains the gain fiber 102 and two splices 105; and the second layer 202 contains two gratings 103, two splices 105 and two TFBs 104. The second layer 202 is stacked on top of the first layer 201 to create the multi-layer fiber laser cavity package 200.

Although the gain fiber 102 and two splices 105 are placed on the first layer 201 in FIG. 2, the first layer 201 may hold one or more elements of the fiber laser cavity. Similarly, the second layer 202 may hold one or more elements of the fiber laser cavity.

Figure 3:
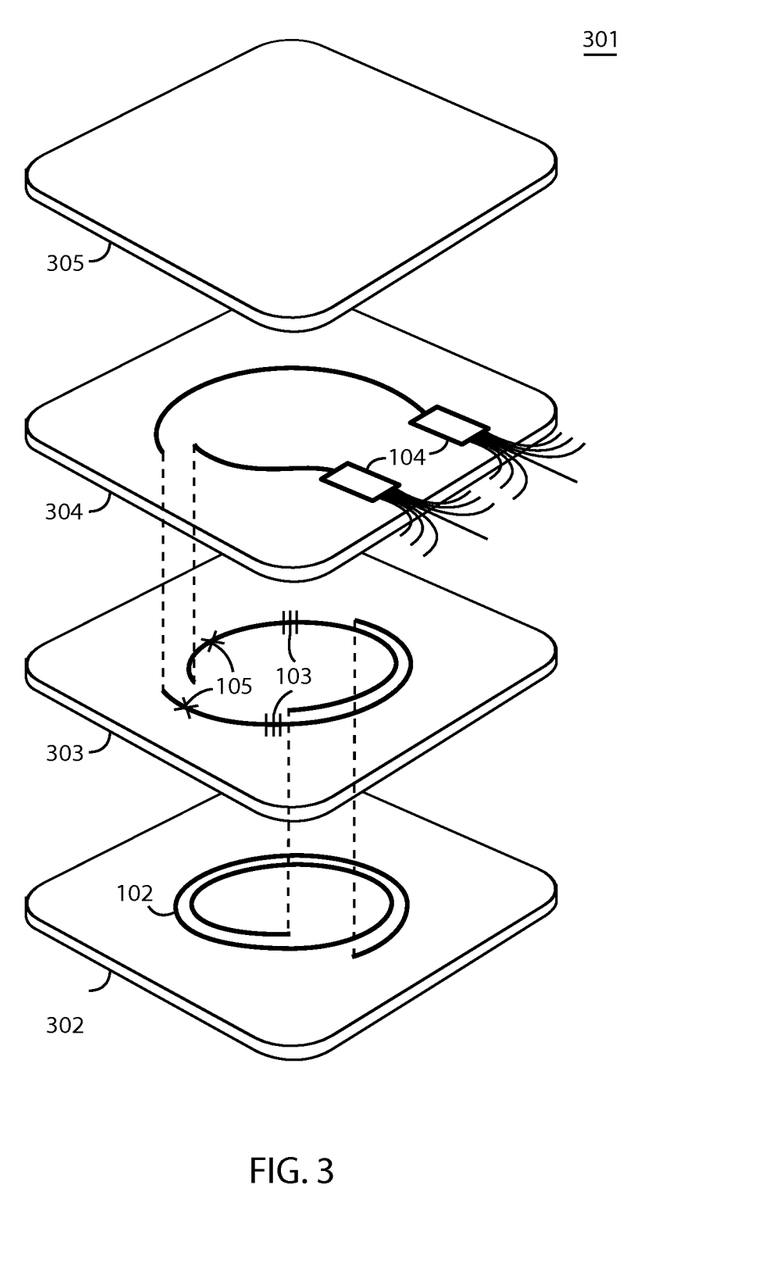
FIG. 3 is a diagram of another fiber laser cavity package according to an embodiment of the present invention.

Furthermore, the multi-layer fiber laser package may include more than two layers. Referring to FIG. 3, another embodiment of a multi-layer fiber laser cavity package 301 according to an embodiment of the present invention is shown. The multi-layer fiber laser cavity package 301 includes three layers: a baseplate 302, a lower fiber plate 303, and an upper fiber plate 304; and a package lid 305. Within the multi-layer fiber laser cavity package 301, the baseplate 302 contains a gain fiber 102; the lower fiber plate 303, which stacks on top of the baseplate 302, contains two gratings 103 and splices 105; and the upper fiber plate 304, which stacks on top of the lower fiber plate 303, contains two TFBs 104.

However, the multi-layer fiber laser cavity package according to the present invention is not limited to configurations described above. For example, number of layers, number of elements on each layer and type of elements on each layer can be changed without exceeding the scope of the present invention. Also, a layer can be any shape having a heat-conducting surface capable of placing selected elements of a fiber laser cavity to be stored in a package.

Regardless of the configuration, the multi-layer fiber laser cavity package according to the present invention comprises a first layer containing one or more elements of a fiber laser cavity, and one or more layers stacked on top of the first layer that contain the rest of the elements of the fiber laser cavity. The elements include a gain fiber 102, a grating 103, a splice 105 and a TFB 104. Also, substantially all of the fiber laser cavity in the package is in contact with a heat-conducting surface to dissipate heat generated from different portions of the fiber laser cavity during operation. Furthermore, the fiber laser cavity passes from one layer to another layer without any fiber crossings. By maximizing heat conductivity of the fiber laser cavity, a more efficient fiber laser cavity package can be created.

The heat-conducting surface on each layer dissipates heat from the part of the fiber laser cavity physically in contact with the heat-conducting surface when the fiber laser cavity is in operation. The heat-conducting surface has appropriate thermal conductivity to dissipate sufficient amount of heat from the one or more elements in contact to allow continuous operation of the fiber laser cavity under a specific operational condition. Preferably, the heat-conducting surface of any layer has a thermal conductivity of equal to or greater than 1 $W \cdot m^{-1} \cdot K^{-1}$.

Furthermore, the multi-layer fiber laser cavity package 200 in FIG. 2, 300 in FIG. 3 or any other configuration may include a cooling source. The cooling source may be a single source or multiple sources and may be placed in more than one place to provide efficient heat dissipation. Preferably, the cooling source is attached to a layer containing the gain fiber 102 such as the first layer 201 in FIG. 2 or the baseplate 302 in FIG. 3. Such configuration would optimize thermal management within the package because a gain fiber usually generates the most heat and the heat generated by the gain fiber is efficiently transferred to outside of the package by attaching the cooling source to a layer contains the gain fiber. The other layers are also thermally connected to the cooling source by being in physical contact with the layer attached to the cooling source such that unwanted heat generated in the other layers is transferred to the cooling source as well.

When the fiber laser cavity is stored in the multi-layer fiber laser cavity package 200 or 300, fiber laser cavity is arranged such that fiber crossings is eliminated within the package 200 or 300 even when the fiber laser cavity passes from one layer to another layer. In order to eliminate fiber crossings when the fiber laser cavity passes through one layer to another layer, one or more slots may be placed in appropriate locations between the layers.

Figure 4:
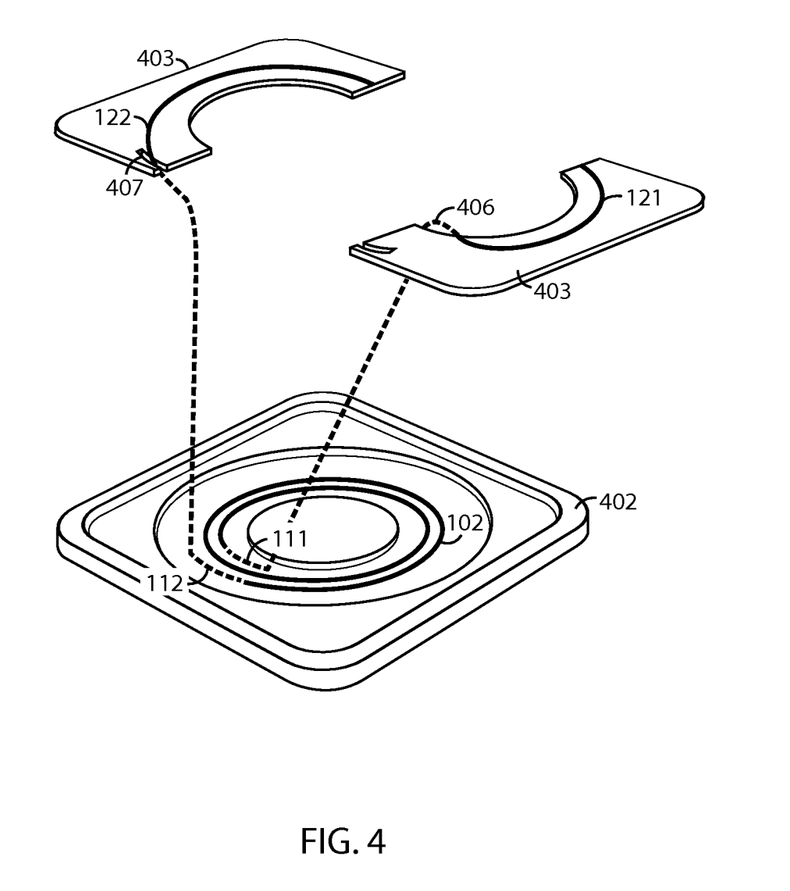
FIG. 4 is a diagram of slots used in a fiber laser cavity package according to an embodiment of the present invention.

Referring to FIG. 4, one embodiment of the slots is shown. In this particular configuration, a gain fiber 102 is placed on a baseplate 402 in a spiral shape. The gain fiber 102 has an inner end 111 and an outer end 112. The inner end 111 is optically connected to a first portion 121 of the fiber laser cavity stored in the lower fiber plate 403, and the outer end 112 is optically connected to a second portion 122 of the fiber laser cavity stored in the lower fiber plate 403. In order to transition smoothly from the baseplate 402 to the lower fiber plate 403 and eliminate any fiber crossings, the first slot 406 is placed near the inner end 111 of the gain fiber 102 to pass the inner end 111 of the gain fiber 102 to the lower fiber plate 403. Similarly, the second slot 407 is placed near the outer end 112 of the gain fiber 102 to pass the outer end 112 of the gain fiber 102 to the lower fiber plate 403.

Furthermore, elements of the fiber laser cavity further include monitoring elements. Monitoring elements are used to measure key performance parameters such as temperature, power, intensity and efficiency. For example, a photodiode is a monitoring element that placed at or near the output end of the fiber laser cavity to detect the intensity of the light exiting the laser cavity. Usually, the signal current from this photodiode is used as a feedback source for the laser drive circuits or for output power stabilization of the fiber laser. However, those monitoring elements are also sensitive to heat that may affect accuracy of the measurement. Therefore, it is preferred to treat such monitoring elements as elements of the fiber laser cavity, and dissipate heat by placing them on a heat-conducting surface.

Figure 5:
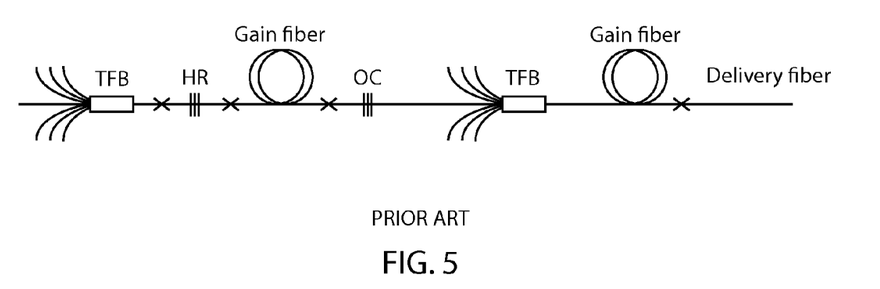
FIG. 5 is a diagram of an example of a conventional multi-stage fiber laser cavity.
Figure 6:
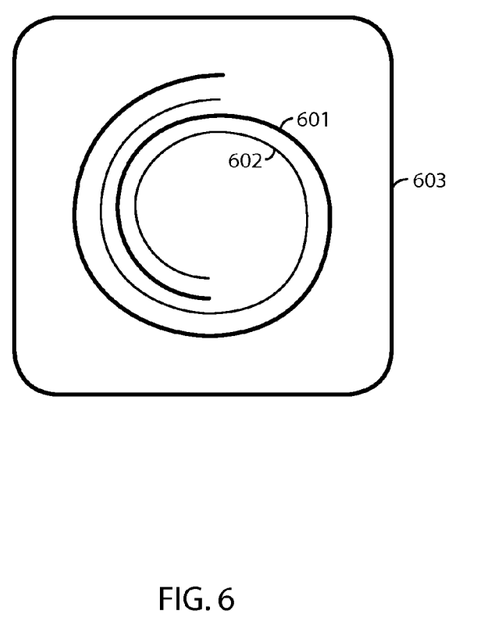
FIG. 6 is a diagram of two gain fibers on a single layer according to an embodiment of the present invention.

The multi-layer fiber laser cavity package according to the present invention may also store a multi-stage fiber laser cavity. A multi-stage fiber laser cavity is a fiber laser cavity having more than one gain fibers. FIG. 5 shows an exemplary multi-stage fiber laser cavity. In order to store multiple gain fibers, the multi-layer fiber laser cavity package may store each gain fiber in a separate layer. Alternatively, a single layer may contain multiple gain fibers by placing them side by side. For example, two gain fibers 601 and 602, which are separated by other elements of the fiber laser cavity may be placed on a layer 603 in a spiral shape side by side as shown in FIG. 6.

Figure 7:
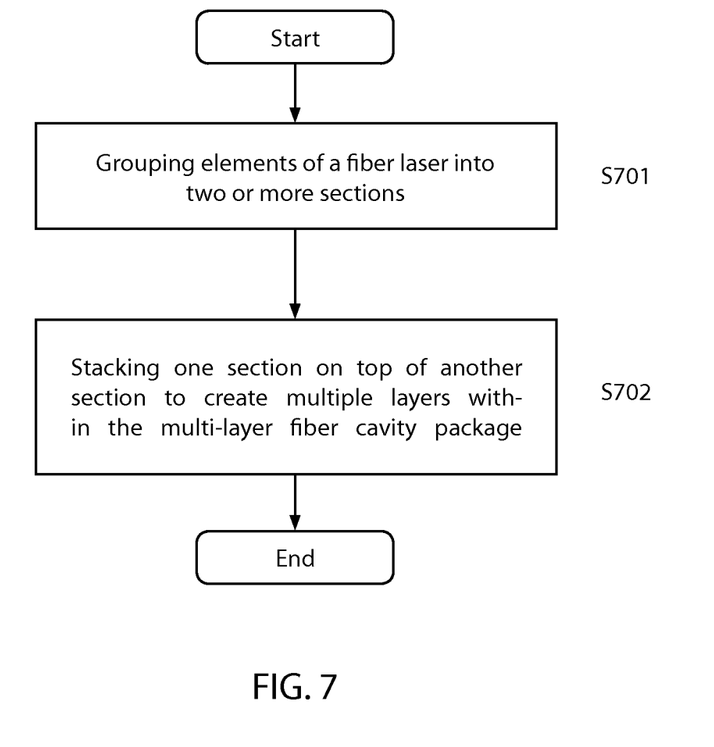
FIG. 7 is a flow chart of a method of making a fiber laser cavity package according to one aspect of the present invention.

Another aspect of the invention is a method of making a multi-layer fiber laser cavity package. FIG. 7 is a flowchart of a method of making a multi-layer fiber laser cavity package according to one aspect of the present invention. The method comprises the following steps:

Grouping elements of a fiber laser cavity into two or more sections (S701), and Stacking one section on top of another section to create multiple layers within the multi-layer fiber laser cavity package (S702).

The elements include a gain fiber, a grating, a splice and a TFB. Also, substantially all of the fiber laser cavity in the package is in contact with a heat-conducting surface to dissipate heat generated from different portions of the fiber laser cavity during operation. Furthermore, the fiber laser cavity passes from one layer to another layer without any fiber crossings. Fiber management that substantially reduces or eliminates fiber crossings within the fiber laser cavity package is important because fiber crossings within the package may cause thermal management and structural issues, especially for high-power lasers.

When a fiber laser cavity is stored in a multi-layer fiber laser cavity package, one or more elements of the fiber laser cavity such as a gain fiber, a grating, a splice, and a TFB are grouped together into multiple sections. For example, a gain fiber may be grouped as a first section, gratings and splices as a second section and TFB as a third section. Then, each section is placed on a heat-conducting surface, and upper sections are stacking on top of lower sections within the multi-layer fiber laser cavity package. For example, the first section containing the gain fiber may be placed on a heat-conducting surface of a first layer; the second section may be placed on a heat-conducting surface of a second layer, which stacks on top of the first layer; and the third section may be placed on a heat-conducting surface of a third layer, which stacks on top of the second layer. When the fiber laser cavity is stored within the multi-layer fiber laser cavity package, fiber laser cavity is arranged such that fiber crossings is eliminated within the package even when the fiber laser cavity passes from one layer to another layer.

When elements of the fiber laser cavity are grouped into two or more sections as a part of the steps to make a multi-layer fiber laser cavity package, functionality of each element may be considered, in addition to heat generated by each element during operation. The step of grouping may further comprise a step of determining functionality of each element of the fiber laser cavity to be stored within the multi-layer fiber laser cavity package, and a step of separating the elements into different sections according to their functionality. For example, if any element prefers a greater bend radius; such element may be placed on a section, which provides maximum bend radius for the element when the section is placed on a respective layer within the fiber laser cavity package.

Alternatively or in combination, when elements of the fiber laser cavity are grouped into two or more sections as a part of the steps to make a multi-layer fiber laser cavity package, accessibility of each element may be considered, in addition to the heat generated by each element during operation. The step of grouping may further comprise a step of selecting elements that are desired to be accessed without disturbing the rest of the elements, and a step of separating selected elements into different sections. For example, one layer may only have TFBs of the fiber laser cavity because in order to increase output power of a fiber laser, the TFB may be replaced or modified to accept more pump diodes. Also, a delivery fiber, which is usually attached to one end of a fiber laser cavity, may be replaced according to the output power of a fiber laser.

Furthermore, the heat-conducting surfaces that contact with selected elements may be etched to create a groove that receives the selected elements. The groove improves thermal conductivity of the heat-conducting surface, and therefore, the heat-conducting surface can dissipate more heat from the elements placed in the groove. For example, selected elements placed in the groove may be a gain fiber, one or more splices or gratings. Or, substantially all or the entire fiber laser cavity may be placed into the grooves in the respective layers to substantially eliminate areas of the fiber laser cavity that expose to air.

Alternatively or in combination, the selected elements may be covered or potted with high thermal conductivity material such as silicone. The high thermal conductivity material increases heat transfer from the selected elements to the heat-conducting surface. The silicone may be molded on appropriate portion(s) of the heat-conducting surface before the selected elements are placed on the heat-conducting surface, or the high thermal conductivity material may cover the selected elements after the selected elements are placed on the heat-conducting surface. Preferably, the high thermal conductivity material fills in the space between layers to improve heat conductivity of each layer by substantially removing air between the layers.

Figure 8:
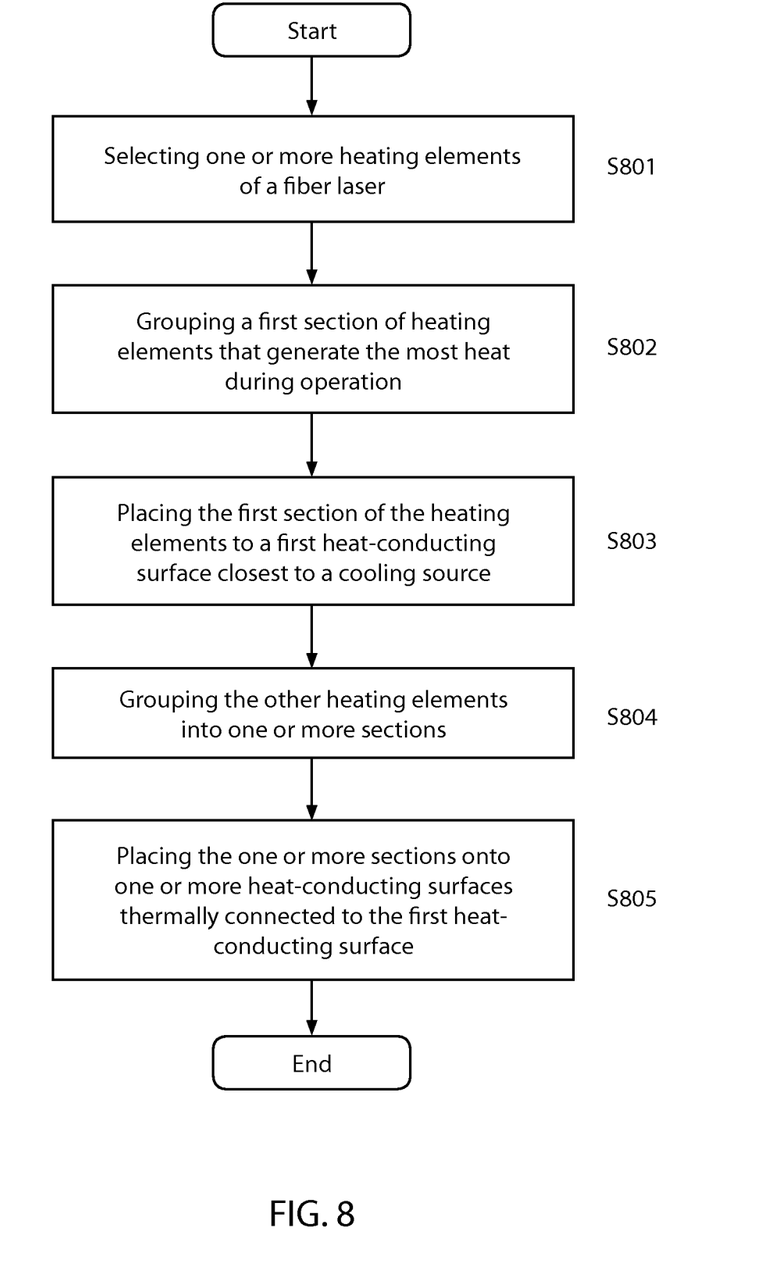
FIG. 8 is a flowchart of another method of making a laser cavity package according to one aspect of the present invention

Furthermore, improvements in fiber management within the fiber laser cavity package can be achieved using alternative fiber management methods. One method according to an embodiment of the present invention is to store a fiber laser cavity in a package by selecting one or more heating elements. FIG. 8 is a flowchart of the alternative method. The method comprises the following steps:

Selecting one or more heating elements of a fiber laser cavity (S801),

Grouping a first section of heating elements that generate the most heat during operation (S802), Placing the first section of the heating elements to a first heat-conducting surface closest to a cooling source (S803), Grouping the other heating elements into one or more sections (S804), and Placing the one or more sections onto one or more heat-conducting surfaces thermally connected to the first heat-conducting surface (S805).

The heating elements are different portions of the fiber laser cavity, which generate relatively large amount of heat comparing to other portions of the fiber laser cavity and include a gain fiber, a grating, a splice and a TFB. For example, for a fiber laser cavity having 200 μm diameter, any portions of the fiber laser cavity that generates 0.05° C. or more per 1 W of pumped power may be considered as a heating element. To dissipate heat, the heating elements are placed on one or more heat-conducting surfaces. Especially, the heating element that generates the most heat is placed on a heat-conducting surface closest to a cooling source. Furthermore, when the fiber laser cavity is stored in the package, the fiber laser cavity passes from the first heat-conducting surface closest to the cooling source to the one or more heat-conducting surfaces without any fiber crossings.

Figure 9:
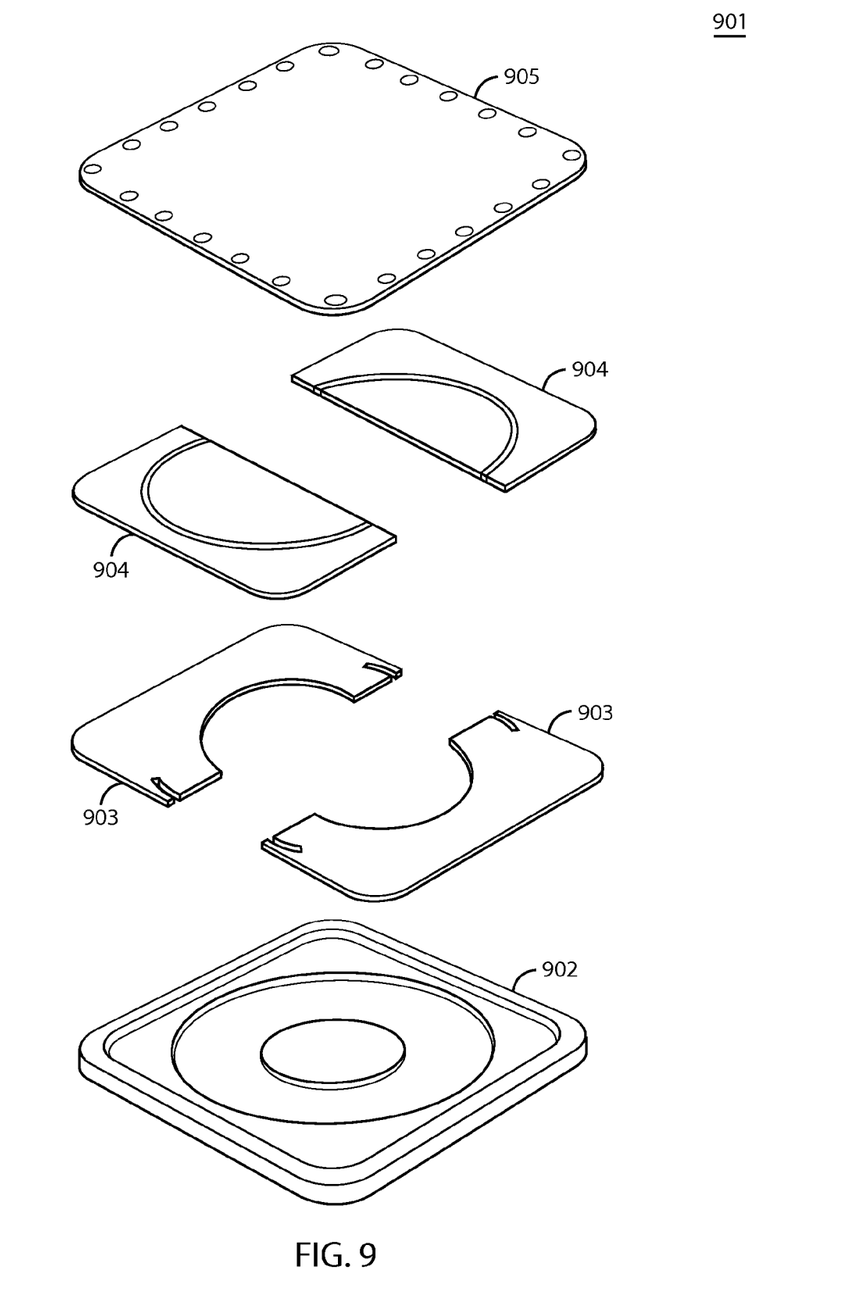
FIG. 9 is a diagram of a fiber laser cavity package according to the method described in FIG. 8.

Referring to FIG. 9, one embodiment of a multi-layer fiber laser cavity package 901 is shown. The multi-layer fiber laser cavity package 901 includes three layers: a baseplate 902, a lower fiber plate 903, an upper fiber plate 904; and a package lid 905. Because the baseplate 902 will be connected to a larger system, the baseplate 902 acts as a cooling source to cool down the fiber laser cavity stored in the multi-layer fiber laser cavity package 901 during operation.

Before a fiber laser cavity is stored in the multi-layer fiber laser cavity package 901, heating elements of the fiber laser cavity are selected. For example, heating elements can be selected based on actual measurement of heat during operation, or based on calculation or other suitable methods to estimate heat generated by each element of the fiber laser cavity. After one or more heating elements are selected, one or more heating elements that generates the most heat during operation are grouped together as a first section. For example, if a gain fiber is selected as one of the heating elements and determined to generate the most heat, then the gain fiber is selected as the first section and placed on the baseplate 902, which also acts as a cooling source. Other heating elements such as a grating, a splice, and a TFB are grouped together into one or more sections. For example, gratings and splices may be grouped as a second section and TFB as a third section. Then, those sections are placed on one or more heat-conducting surfaces thermally connected to the heat-conducting surface closest to the cooling source. For example, the second section containing gratings and splices may be placed on a heat-conducting surface of the lower fiber plate 903; the third section may be placed on a heat-conducting surface of the upper fiber plate 904. Furthermore, when the fiber laser cavity is stored within the package 901, the fiber laser cavity passes from one layer to another layer without any fiber crossings.

Such fiber management within the fiber laser cavity package according to the present invention provides superior heat management while reducing the overall size of the fiber laser cavity package by placing the heating element (e.g. a gain fiber) that generates the most heat closest to the cooling source and distributing other heating elements to other layers within the fiber laser cavity package. A cooling source can be any heat exchange means that releases heat from the fiber laser cavity package. For example, cooling source can be air cooling, or fluid cooling.

The alternative method is also applicable to other package configurations. For example, the method is applicable to a drum-shaped fiber laser cavity package 1000 shown in FIG. 10. The drum-shaped fiber laser package 1000 includes a drum 1001, a lower plate 1002, and an upper plate 1003. The drum 1001 is connected to a cooling source (not shown) to dissipate heat from a heat element that generate the most heat. The lower plate 1002 is connected at the lower end of the drum 1001 and configured to receive one or more heating elements. Similarly, the upper plate 1003 is connected at the upper end of the drum 1001 and configured to receive one or more heating elements.

Figure 10:
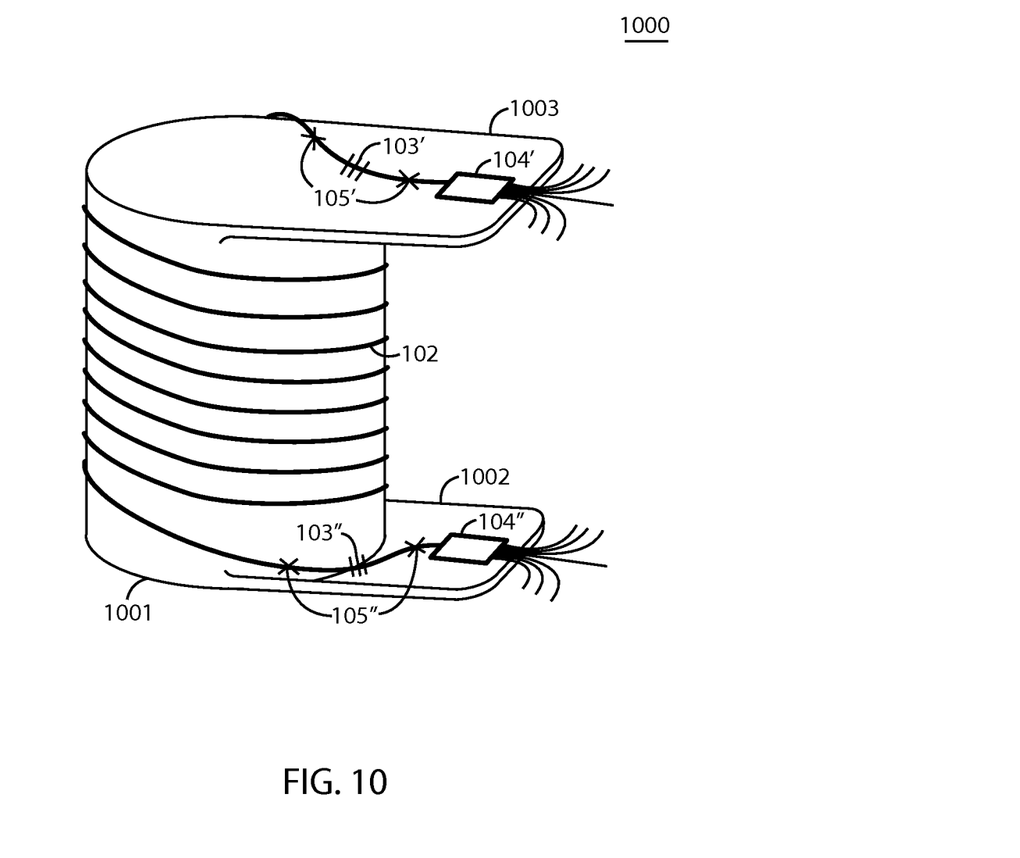
FIG. 10 is a diagram of another fiber laser cavity package according to the method described in FIG. 8.

If a gain fiber 102 is determined to generate the most heat comparing with the rest of the heating elements of the fiber laser cavity, then the drum-shaped fiber laser package 1000 stores the fiber laser cavity as a first section as shown in FIG. 10. In FIG. 10, the gain fiber 102 is placed onto a heat-conductive surface of the drum 1001, and one side of the fiber laser cavity: a grating 103', a TFB 104', and splices 105', is grouped as a second section and placed on the upper plate 1003. Similarly, the other side of the fiber laser cavity: a grating 103", a TFB 104", and splices 105", is grouped as a third section and placed on the lower plate 1002. Placement of the upper plate 1003 and the lower plate 1002 is not limited to the configuration shown in FIG. 10. The upper plate 1003 and the lower plate 1002 can be placed at any desired locations as long as the upper plate 1003 and the lower plate 1002 are thermally connected to the drum 1001.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. For example, the multi-layer fiber laser cavity package of the present invention and methods of making the laser package thereof are applicable to fiber lasers having configurations other than the ones shown as examples in this specification. Also, the scope of the appended claims for both method and apparatus claims includes fiber laser cavity packages capable of storing a multi-stage fiber laser cavity having two or more gain fibers. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-layer fiber laser cavity package comprising:
   a first layer containing one or more elements of a fiber laser cavity; and
   one or more layers stacked on top of the first layer and containing the rest of the elements of the fiber laser cavity,
   wherein the elements are different portions of the fiber laser cavity and include a gain fiber, a grating, a splice and a tapered fiber bundle (TFB); substantially all of the fiber laser cavity in the package is in contact with a heat-conducting surface; and the fiber laser cavity passes from one layer to another without any fiber crossings.

2. The multi-layer fiber laser cavity package according to claim 1, wherein the heat-conducting surface has a thermal conductivity, which is equal to or greater than $1 \text{ W} \cdot \text{m}^{-1} \cdot \text{K}^{-1}$.

3. The multi-layer fiber laser cavity package according to claim 1, further comprises a cooling source attached to the first layer wherein the first layer has the elements, which generates the most heat during operation; and the one or more layers stacked on top of the first layer are thermally connected to the cooling source.

4. The multi-layer fiber laser cavity package according to claim 1, wherein the one or more layers are second and third layers, and the first layer contains the gain fiber, the second layer stacked on top of the first layer contains the grating, and the third layer staked on top of the second layer contains the TFB.

5. The multi-layer fiber laser cavity package according to claim 1, wherein the one or more layers comprise a second layer, and the second layer has one or more slots to pass the fiber laser cavity from the first layer to the second layer.

6. The multi-layer fiber laser cavity package according to claim 5, wherein the gain fiber is placed on the first layer in a spiral shape and has an inner end and an outer end which are optically connected to different portions of the fiber laser cavity, wherein the one or more slots are first and second slots, and the first slot is placed near the inner end of the gain fiber to pass a portion of the fiber laser cavity connected to the inner end of the gain fiber to the second layer, and the second slot is placed near the outer end of the gain fiber to pass a portion of the fiber laser cavity connected to the outer end of the gain fiber to the second layer.

7. The multi-layer fiber laser cavity package according to claim 1, wherein the fiber laser cavity is a multi-stage fiber laser cavity.

8. The multi-layer fiber laser cavity package according to claim 7, wherein the multi-stage fiber laser cavity comprises two gain fibers separated by other elements of the fiber laser cavity, wherein the two gain fibers are placed on the first layer in a spiral shape side by side.

9. A method of making a multi-layer fiber laser cavity package comprising the steps of:
grouping elements of a fiber laser cavity into two or more sections; and
stacking one section on top of another section to create multiple layers within the multi-layer fiber laser cavity package,
wherein the elements include a gain fiber, a grating, a splice and a TFB; substantially all of the fiber laser cavity is in contact with a heat-conducting surface; and fiber laser cavity passes from one layer to another layer without any fiber crossings.

10. The method according to claim 9, wherein the heat-conducting surface has a thermal conductivity, which is equal to or greater than $1 \text{ W·m}^{-1}\text{·K}^{-1}$.

11. The method according to claim 9, wherein a layer having the element that generates the greatest heat during operation is placed closest to a cooling source when the layer is stacked.

12. The method according to claim 9, wherein the elements further include monitoring elements.

13. The method according to claim 9, wherein the step of grouping elements of a fiber laser cavity into two or more sections further comprises a step of determining functionality of each element, and a step of separating the elements into different sections according to their functionality.

14. The method according to claim 9, wherein the step of grouping elements of a fiber laser cavity into two or more sections further comprises a step of selecting elements that are desired to be accessed without disturbing the rest of the elements, and a step of separating selected elements into different sections.

15. The method according to claim 9, wherein the heat-conducting surfaces that contact with selected elements are etched to create a groove to receive the selected elements, wherein the selected elements comprise the gain fiber, the splice or the grating.

16. The method according to claim 15, wherein the selected elements are the fiber laser cavity.

17. The method according to claim 9, wherein at least one element is covered by high thermal conductivity material.

18. The method according to claim 17, wherein the high thermal conductivity material is silicone.

19. The method according to claim 18, wherein the silicone fills in the space between layers to substantially eliminate air between the layers.

20. A method of making a fiber laser cavity package comprising the steps of:
selecting one or more heating elements of a fiber laser cavity,
grouping a first section of heating elements that generate the most heat during operation,
placing the first section of the heating elements to a first heat-conducting surface closest to a cooling source,
grouping the other heating elements into one or more sections, and
placing the one or more sections onto one or more heat-conducting surfaces thermally connected to the first heat-conducting surface,
wherein the heating elements are different portions of the fiber laser cavity and include a gain fiber, a grating, a splice and a TFB; and fiber laser cavity passes from one heat-conducting surface to another heat-conducting surface without any fiber crossings.

21. The method according to claim 20, wherein the heat-conducting surfaces have a thermal conductivity, which is equal to or greater than $1 \text{ W·m}^{-1}\text{·K}^{-1}$.

22. The method according to claim 20 wherein each heat-conducting surface is a separate layer within the laser cavity package.

23. The method according to claim 20, wherein the first heat-conducting surface is a drum.

24. The method according to claim 20, wherein the first section of heating elements includes the gain fiber.

25. The method according to claim 20, wherein the step of grouping the other heating elements into one or more sections further comprises a step of determining functionality of each heating element, and a step of separating the heating elements into different sections according to the functionality.

26. The method according to claim 20, wherein the step of grouping the other heating elements into one or more sections further comprises a step of selecting heating elements that are desired to be accessed without disturbing the rest of the heating elements, and a step of separating selected heating elements into different sections.

* * * * *